United States Patent
Chao (10) Patent No.: US 6,398,436 B1
(45) Date of Patent: *Jun. 4, 2002

(54) SPILL PROTECTION FOR ELECTRONIC DEVICES

(75) Inventor: James Lee Chao, Durham, NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/547,504

(22) Filed: Apr. 12, 2000

(51) Int. Cl.[7] ................................................ B41J 27/02
(52) U.S. Cl. ........................................ 400/472; 361/679
(58) Field of Search ................................ 400/472, 490; 341/21, 22, 168; 361/679, 680, 681; 345/168–172; 235/145 R, 146 A (56) References Cited

U.S. PATENT DOCUMENTS

| | | |
|---|---|---|
| 4,020,328 A | 4/1977 | Bradam |
| 4,286,082 A | 8/1981 | Tsubakimoto et al. ....... 526/240 |
| 4,482,064 A | 11/1984 | Berke et al. ................. 211/69.1 |
| 4,489,227 A | 12/1984 | Lamarche .................... 200/314 |
| 4,654,039 A | 3/1987 | Brandt et al. ................ 604/368 |
| 4,673,402 A | 6/1987 | Weisman et al. ............ 604/368 |
| 4,685,915 A | 8/1987 | Hasse et al. ................. 604/378 |
| 4,783,510 A | 11/1988 | Saotome ................... 525/329.7 |
| 4,948,281 A | 8/1990 | Werner ........................ 400/472 |
| 5,026,589 A | 6/1991 | Schechtman ................ 428/138 |
| 5,217,803 A | 6/1993 | McBride et al. ............. 428/323 |
| 5,356,678 A | 10/1994 | Heitzhaus et al. .......... 428/35.6 |
| 5,481,343 A * | 1/1996 | Bhagat ........................ 355/259 |
| 5,491,478 A | 2/1996 | de la Luz et al. ............ 341/22 |
| 5,525,979 A | 6/1996 | Engle et al. .................. 341/32 |
| 5,681,122 A | 10/1997 | Burke .......................... 400/472 |
| 5,810,491 A * | 9/1998 | Muller et al. ................ 400/496 |
| 5,872,527 A | 2/1999 | Yanagisawa .................. 341/22 |
| 5,925,439 A | 7/1999 | Hauback ...................... 428/178 |
| 5,998,025 A | 12/1999 | Kido et al. ................... 428/370 |
| 6,054,939 A * | 4/2000 | Wei et al. ...................... 341/20 |
| 6,086,985 A * | 7/2000 | Shaw-Klein et al. ...... 428/304.4 |
| 6,099,950 A * | 8/2000 | Wang et al. .............. 428/304.4 |

* cited by examiner

*Primary Examiner*—John S. Hilten
*Assistant Examiner*—Darius N. Cone
(74) *Attorney, Agent, or Firm*—Andrew Dillon (57) ABSTRACT

The present invention offers an improved method of reversibly absorbing aqueous solution penetrations into electronic equipment. The method comprises providing an absorbent structure having a certain thickness, the thickness defined by the desired or expected use of the electronic equipment such as a computer keyboard, cellular phone, ATM machine keyboard, radios, PDAs, remote controls, and other electronic devices that might be compromised by liquids and aqueous solutions, rain and the like. The absorbent structure comprises at least a water-permeable top sheet, a hydrogel-forming core, and a water-impermeable back sheet. Several layers and combinations of layers may also be provided, depending upon the desired usage. The absorbent structure is further characterized by having formations that allow for access to and penetration of electronic and mechanical elements such as keys on a keyboard or keypad and other elements that might allow for the penetration of liquids beneath to the underlying electronic circuitry.

34 Claims, 5 Drawing Sheets

SPILL PROTECTION FOR ELECTRONIC DEVICES

BACKGROUND OF THE INVENTION

1. Technical Field

The present invention relates in general to absorbent structures for electronic equipment and methods of preventing the encroachment of liquids into the electronic circuitry of devices. More particularly, the present invention relates to the use of a hydrogel-forming compounds such as salts of polyacrylate encased in a pre-formed structure that fits within such articles as computer keyboards in order to prevent the encroachment of liquids into the electronic circuitry of the keyboard.

2. Description of the Related Art

In typical usage, various types of electronic devices such as computers, cell phones, remote controls, PDAs, radios, and other electronic articles require human contact and are thus exposed to possible liquid spills and encroachment by rain, and/or water laden vapor including high humidity and fogs, etc. The cost of replacing electronic circuitry due to liquid compromise, which typically leads to shorts in the system, the failure of keyboard elements, etc, is great when considering that computer keyboards are so prevalent, and their use along with our daily activities, such as in cell phones and laptop computers, is so commonplace. Thus, there has been great interest in a means of protecting such electronic devices from liquid spills.

Most attempts to block liquid spills in electronic devices involve the use of an impermeable liquid barrier that diverts the flow of liquids that should fall into the crevices of a keypad or keyboard. The impermeable barriers in the prior art, such as disclosed in U.S. Pat. No. 5,681,122 involve the use of a tray having walls and a spillway that is located below the external facie of the computer keyboard but above the electronic equipment, the tray having formations to allow the keys of the keyboard to float through. Spills would then fall into the spaces between the facie and keys and into the tray, to be collected at the spillway. Other means of protecting electronic devices from liquid spills include such means as disclosed in U.S. Pat. No. 5,491,478, wherein a unitary molded seal membrane is sealed over the top of keys on a cell phone or keyboard keypad, thus directly blocking the flow of spills. A third protection means is a thermal heat seal of a laminated PVC membrane with the electronic traces contained within the seal. This, however, offers only limited water resistance, and breaks down over time.

There are numerous problems with the prior art. The use of such means as a tray requires that the liquid fall downwardly directly into the keypad or keyboard. This does not take into account the encroachment of moisture due to rain, fog, or spills that are substantially non-vertical. The problem with the membrane-type of barrier is that they prevent free and unhindered use of the keypad or keyboard. Further, these membranes typically wear over time and become translucent or even opaque, thus requiring replacement. Since these articles must be fastened securely around the keypad or keyboard, it is not convenient for a typical user to easily replace them. As mentioned above, sealed plastic laminates offer only minimal protection and requires thin silver traces, which is subject to corrosion, fatigue, and cracking.

There is thus a need for an improved method of protecting the electronic circuitry in devices such as cell phones, ATM machine keypads, laptop computer keypads, remote controls, PDAs, radios, and other devices where the threat of liquid spill or moisture exposure may be present. This need is heightened by the fact that electronic equipment such as laptop computers, cell phones, phones in phone booths, marine electronic equipment, and other electronic equipment finds more widespread outdoor use.

SUMMARY OF THE INVENTION

It is therefore one object of the present invention to provide an improved means of protecting electronic circuitry in electronic devices from liquid spills and moisture.

It is another object of the present invention to provide an absorbent structure within electronic devices that can reversibly absorb liquids or can be easily and conveniently changed out.

It is yet another object of the present invention to provide a means of protecting keypads and keyboards functionally associated with electronic devices from rain, moisture, fogs, mists, condensate, and other non-vertical spills and liquid encroachment.

The foregoing are achieved as is now described, wherein a method of reversibly absorbing aqueous solution penetrations into electronic devices having a body and circuitry is herein disclosed and claimed. The method comprises providing an absorbent structure having a defined thickness, the structure comprising a water-permeable top sheet, a hydrogel-forming core, and a back sheet. The back sheet may be either water-permeable or water-impermeable. The defined thickness is between about 0.1 mm and 7 mm, and preferably between about 0.5 mm and 5 mm. The absorbent structure is further characterized by having formations that allow for access to and penetration of electronic and mechanical elements. For example, the formations and shape of the structure would allow the unitary structure to fit within and around a typical computer keyboard between the external facie and electronic circuitry to be protected.

The absorbent structure is placed within the electronic device such that the top sheet portion of the structure faces away from electronic circuitry to be protected, although other embodiments may entail an absorbent structure having two water-permeable layers surrounding the hydrogel core. Further, adequate expansion volume is provided between the structure and the electronic device body when placed within the device.

The hydrogel-forming core can comprise one hydrogel forming compound such as sodium polyacrylate, or a mixture of compounds and other cross-linking agents. The top sheet is typically made from water-permeable polyethylene or cotton/paper material, and the backsheet is made from water-impermeable polyethylene or polyolefin material.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention offers an improved method of reversibly absorbing aqueous solution penetrations into electronic equipment. The method comprises providing an absorbent structure in a sheet-like form, the structure containing a hydrogel-forming core. In a preferred embodiment, the structure has a certain thickness, the thickness defined by the desired or expected use of the electronic equipment such as a computer keyboard, cellular phone, ATM machine keyboard, and other electronic devices that might be compromised by liquids and aqueous solutions, rain and the like.

The absorbent structure comprises at least a water-permeable top sheet, a hydrogel-forming core, and a back sheet that is either water-permeable or water-impermeable. The hydrogel-forming core typically comprises at least one hydrogel-forming compound in dry (dehydrated) powder or powder/crystalline form. Several layers and combinations of layers may also be provided, depending upon the desired usage. The absorbent structure is further characterized by having formations that allow for access to and penetration of electronic and mechanical elements such as keys on a keyboard or keypad and other elements that might allow for the penetration of liquids beneath to the underlying electronic circuitry. An immobilization means may also be provided in the core such as spun cotton fibers, or a glue to adhere the hydrogel-forming compound to the top sheet and/or the bottom sheet. Finally, the structure may have walls within that compartmentalizes the hydrogel-forming compound into smaller areas.

The absorbent structure is placed within the electronic equipment such that the top sheet portion of the structure faces away from electronic circuitry to be protected while the back sheet is typically against the circuitry to be protected. Space is provided to allow for an adequate expansion volume between the absorbent structure and the electronic equipment body once the core comes into contact with a liquid, as typical hydrogel-forming compounds such as sodium polyacrylate will expand when hydrated. The absorbent structure has a thickness typically between 0.1 mm and 7 mm, and preferably between 0.5 and 5 mm.

One embodiment of the present invention employs the use of hydrogel-forming chemical compounds such as sodium polyacrylate to serve as a means of protecting keyboards for computers and other electronic devices from spills, such as from common liquid such as foods and drinks, and from the external environment such as rain and fog. In general, the invention is an absorbent structure for protecting electronic from aqueous or liquid spills and from aqueous penetrations into the delicate electronic circuitry underlying the external features of devices such as computer keyboards, cellular phones, etc. Keyboards are particularly sensitive to electrical shorting when subjected to liquids which penetrate the unit from rain, spills, or drinks, fogs, mists, condensation, etc. Hydrogel-forming compounds such as sodium polyacrylate can absorb as much as 800–1,000 times its mass in water in fractions of second. The absorbent structure of the present invention is characterized and being formed such that it would reside within the electronic equipment but above and around the delicate circuitry to be protected.

Figure 1:
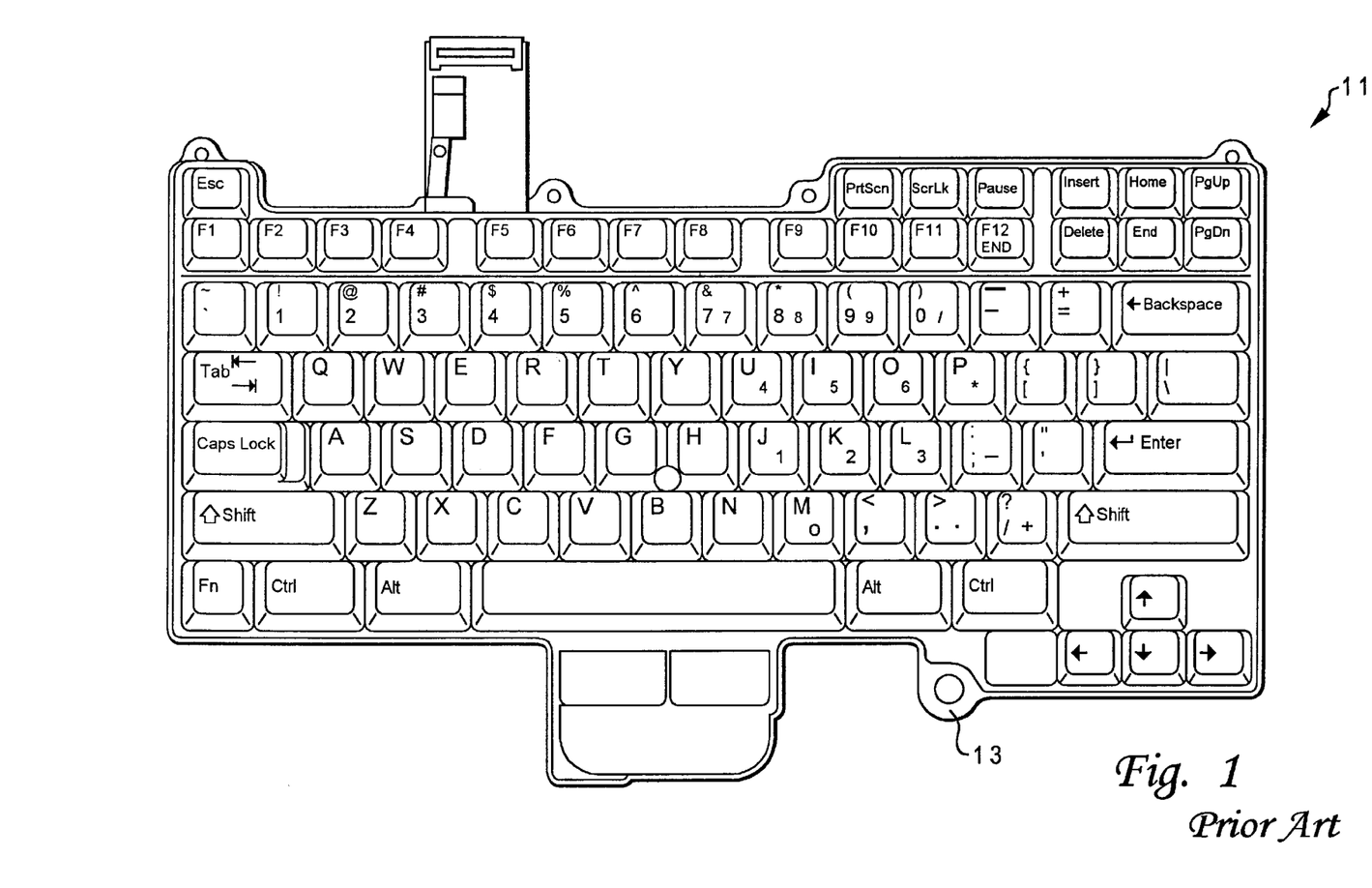
FIG. 1 is a top view of a mobile laptop keyboard assembly with prior art metal tray for spill collection.
Figure 2:
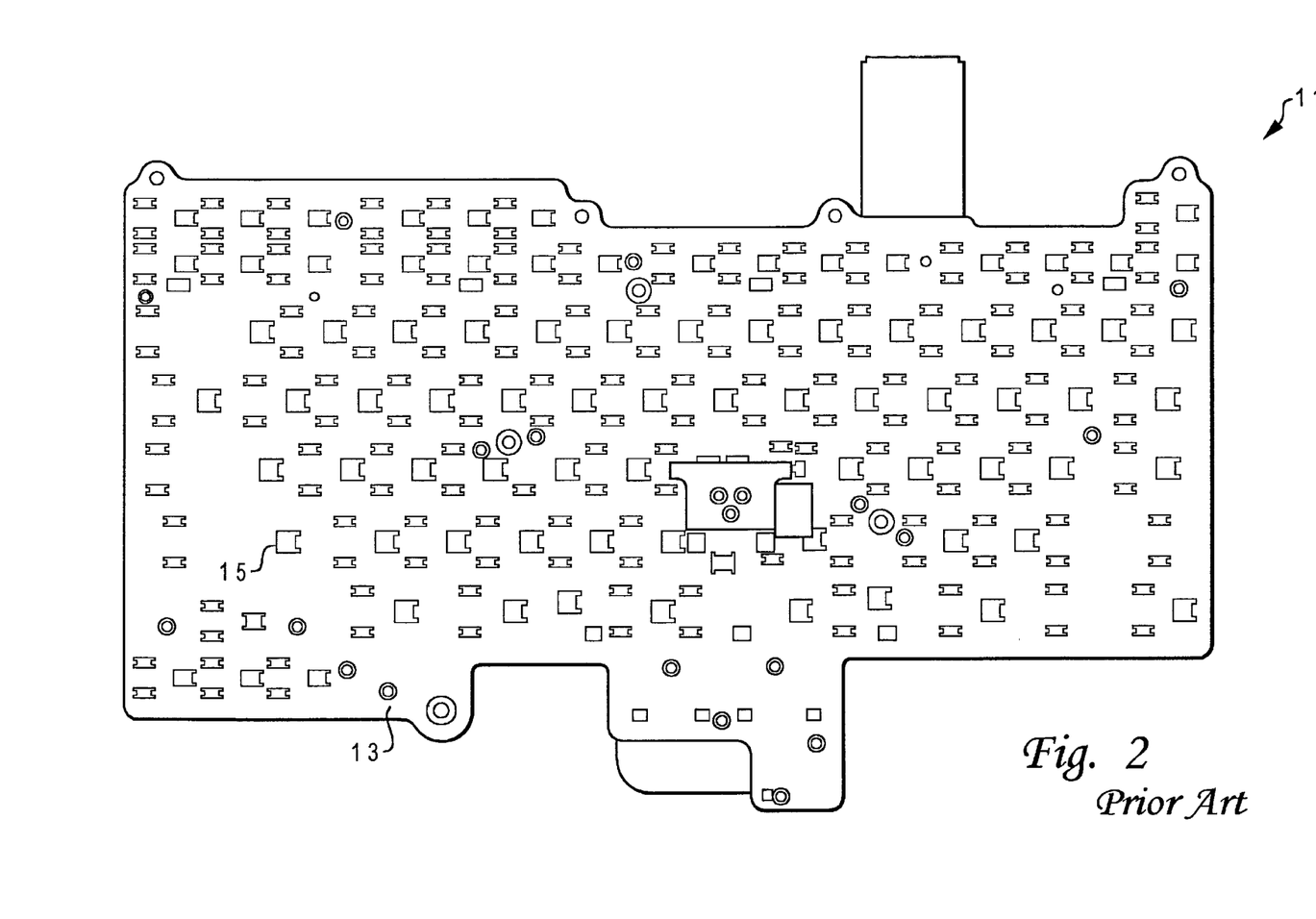
FIG. 2 is a bottom view of the keyboard in FIG. 1.
Figure 3:
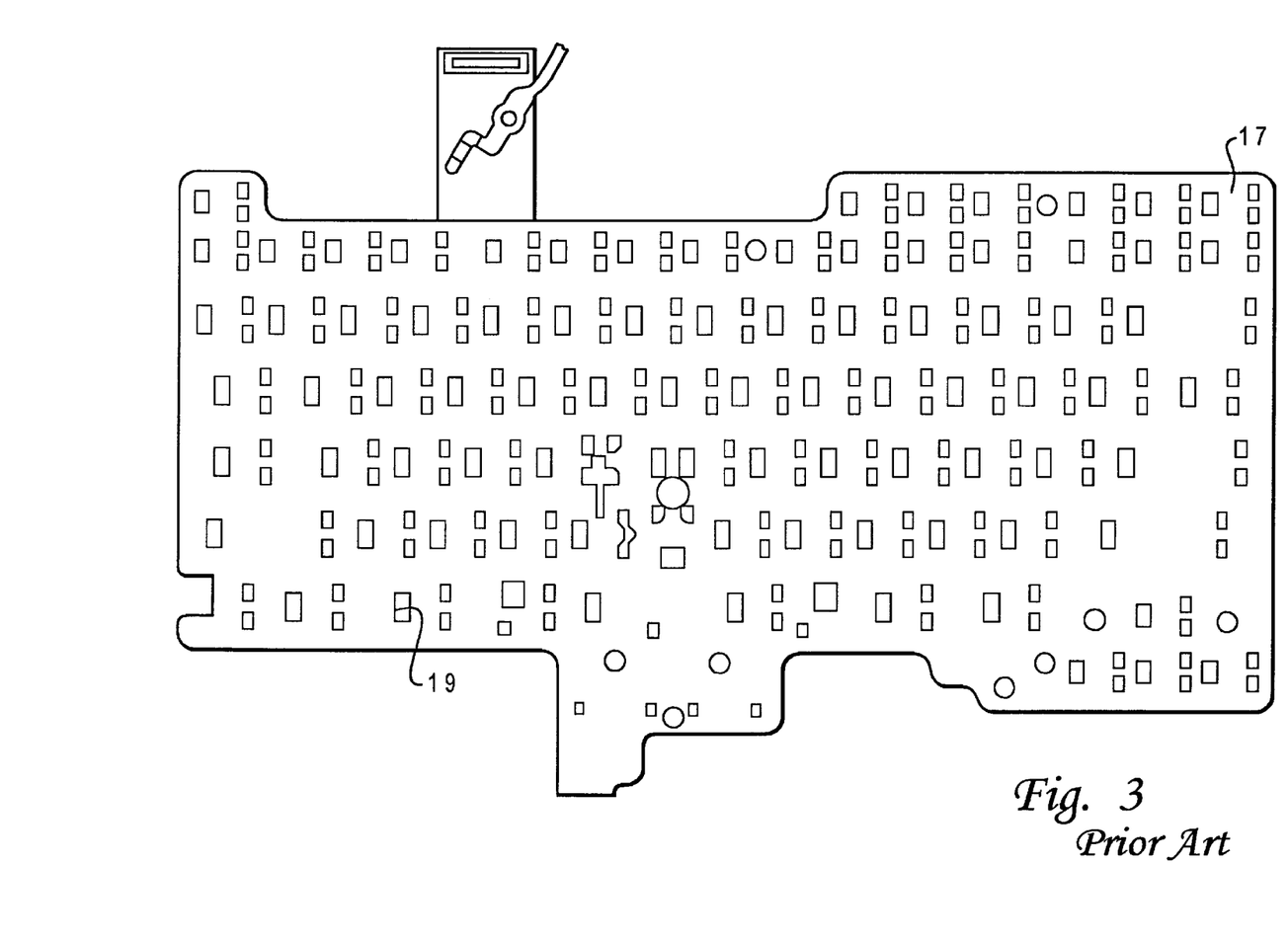
FIG. 3 is a view of the sealed silver membrane circuit assembly underlying and functionally associated with the keyboard in FIG. 1.
Figure 4:
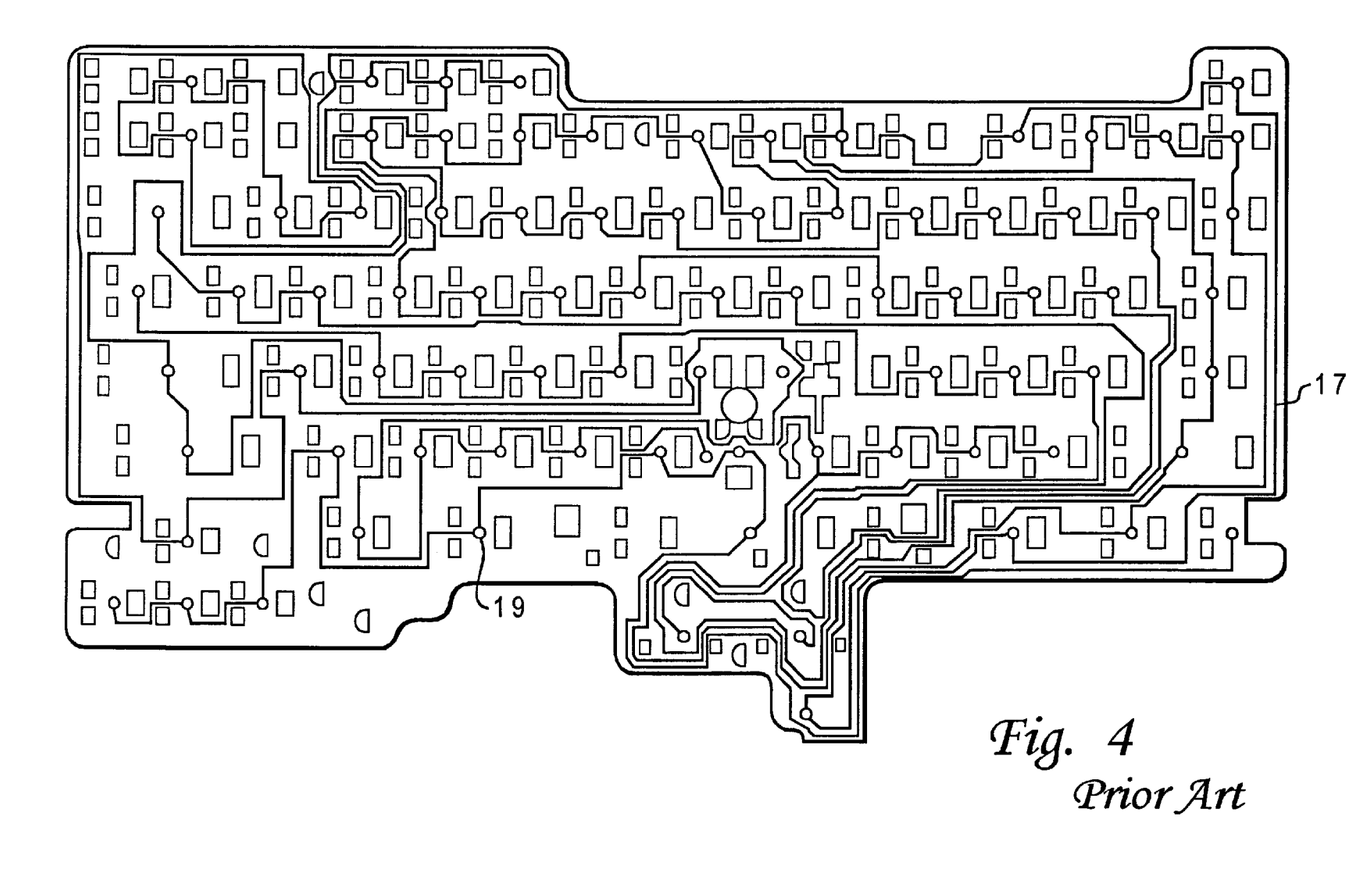
FIG. 4 is an inside view of the sealed silver membrane circuit assembly underlying and functionally associated with the keyboard in FIG. 1.

Although the invention can be designed to protect various types of electronic equipment, one embodiment of the invention will be described with reference to a computer keyboard as shown in FIGS. 1–4. Specifically with reference to FIG. 1, is shown the front side of a mobile laptop keyboard assembly with a prior art metal tray for spill collection. The metal tray 13 is typical in the prior art for protecting keyboards from spills. FIG. 2 shows the back side of the same keyboard 11 as in FIG. 1. The back side view of keyboard 11 in FIG. 2 shows the details of the metal tray 13. In particular, it shows various openings and other formations 15 that allow for access to and penetration of electronic and mechanical elements such as the keypad and individual keys, and other mechanical switches or elements. Those keys in turn cooperate with the circuitry on the circuit assembly 17 shown in FIG. 3. FIG. 3 shows the outside or top portion 19 of a sealed silver membrane circuit assembly, and FIG. 4 shows the bottom portion of a sealed silver membrane circuit assembly. The circuit assembly in FIGS. 3 and 4 has openings and formations 19 that allow for access to the electronic circuitry of the circuit assembly 17. The absorbent structure of the present invention would typically An be placed on top portion 19 of the circuit assembly 17 as in FIG. 3.

The absorbent structure of the present invention is a sheet-like form having at least a hydrogel-forming core. The sheet-like structure can have any number of other configurations, layers, thicknesses, and shapes. One embodiment of the absorbent structure of the present invention is described with respect to FIG. 5, wherein absorbent structure 21 is pre-formed or shaped to conform to the circuit assembly 17, comprising holes and formations 23 therein. Typically, the holes and formations 23 on absorbent structure 21 will substantially match the structures 19 on the circuit assembly 17. This allows the movement of such things as the keys on the board. Access to the circuitry underneath the structure can be gained simply by lifting the structure, which either unattached or only temporarily attached by clips and the like, to the underlying assembly shown in FIG. 3.

Referring back to FIG. 5, The outer edge 27 of absorbent structure 21 is cut and sealed to conform to the underlying shape, in the present embodiment, the keyboard circuit assembly 17 of FIG. 3. Further, the edges around formations 23 are also sealed to keep the hydrogel-forming core intact and sandwiched within the unitary structure 21. Although the absorbent structure 21 is shown fitting circuit assembly 17 for a laptop keyboard assembly 11, it is to be understood that the absorbent structure can take any shape and have any number or size of formations 23 that allow for access to and penetration of electronic and mechanical elements. For instance, the absorbent structure 21 could be shaped to fit inside the keypad of a cellular phone, which would typically have fewer number of formations 23 to accommodate the smaller, mostly numerical key pad. The absorbent structure in all embodiments of the present invention is of a unitary form, meaning that all edges are sealed around the periphery and within the formations, thus forming a completely enclosed sandwich structure wherein the hydrogel-forming core is contained within the top sheet and back sheet.

Figure 6:
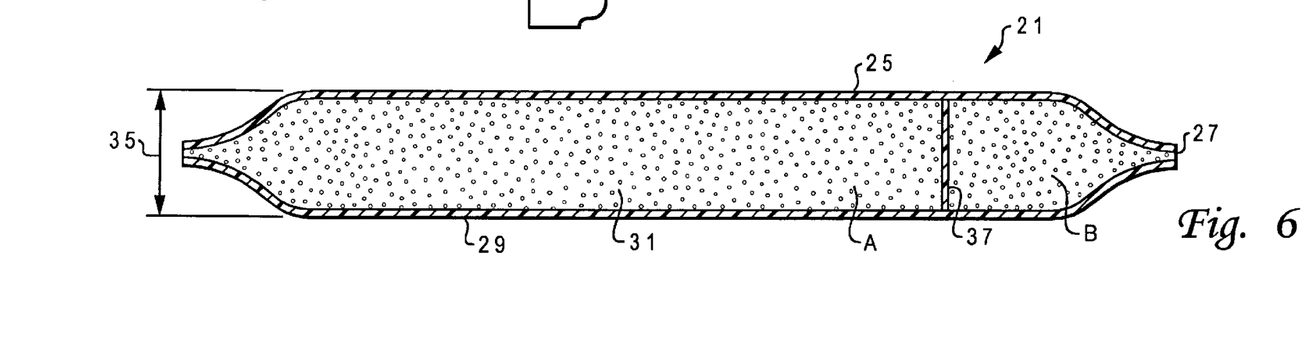
FIG. 6 is a cutaway side view of the absorbent structure in FIG. 5.

A more detailed description of the absorbent structure is described with reference to FIG. 6. Specifically, FIG. 6 shows a cutaway side view of a three-layered embodiment of the absorbent structure 21. Although a three-layer structure is shown, it is to be understood that multiple layers can be incorporated within the structure 21, such as two top sheets having another hydrogel-forming core there between. In the embodiment in FIG. 6, the water-permeable top sheet 25 and the back sheet 29 form a pouch with sealed edges 27, wherein a hydrogel-forming core 31 resides. The hydrogel-forming core 31 consists of at least one hydrogel-forming compound in a powder or granular form, or in other words, a substantially dry or dehydrated form. Examples of suitable hydrogel-forming compounds that would make up the hydrogel-forming core 31 are sodium polyacrylate, other acrylic acid salt polymers, olefinically unsaturated sulfonic acids, polyvinyl based compounds, cyanomethyl cellulose polymers, carboxymethyl cellulose polymers, and others. Such hydrogel-forming compounds are disclosed in U.S. Pat. No. 4,286,082 and U.S. Pat. No. 4,654,039. Further, various mixtures of hydrogel-forming compounds may be used. Suitable salt-forming cations include alkaline metal, ammonium, substituted ammonium, and amines. The present invention is by no means limited to any particular hydrogel-forming compound, but can be used with a variety of substances that can reversibly absorb water. By reversibly absorbing water, it is meant that the hydrogel-forming compound or mixture of compounds, once exposed to water and thus hydrated, can be dehydrated by either exposure to dry air, heating, or a combination of the two. It is desirable that a hydrogel-forming compound be used that can be dehydrated with minimal heating.

Typically, hydrogel-forming compounds comprise polymers of polymerizable unsaturated carboxylic acids or derivatives thereof, such as acrylic acid and/or alkali metal and alkyl acrylates. These polymers are rendered water-insoluble by cross-linking the carboxyl group-containing polymer chains using conventional cross-linking agents such as di- or poly-functional monomer materials. The degree of cross-linking in hydrogel and hydrogel-forming compounds not only determines their water solubility, but is also an important factor in establishing two other characteristics of fluid absorbing hydrogels: absorbent capacity and gel strength. Absorbent capacity or "gel volume" is a measure of the amount of water or body fluid which a given amount of hydrogel-forming compound will absorb. Gel strength relates to the tendency of the hydrogel formed from such materials to deform or flow under an applied stress.

The gel volume (V %) can be calculated for a given hydrogel-forming compound using the following equation:

$$V\% = \{(D-C)/C\} \times 100$$

wherein C is the weight in grams of the hydrogel-forming compound prior to water or liquid absorption, and D is the weight in grams of the hydrogel-forming compound after water absorption with excess liquid removed.

Hydrogel-forming compounds useful as absorbents in articles such as the present invention must have adequately high-gel volume and the hydrogels formed therefrom must have adequately high gel strength. Gel volume must be sufficiently high to enable the hydrogel-forming compound to absorb a significant amount of fluid which electronic devices may encounter such as spills from cups of liquids, moisture from the air, fog, rain, etc. Gel strength must be such that the hydrogel formed does not deform and fill to an unacceptable degree the capillary void space in the absorbent structure, thereby inhibiting both absorbent capacity of the structure and fluid distribution throughout the structure or article.

In a typical embodiment of the present invention, from about 0.5 to 2 grams of hydrogel-forming compound or mixtures of compounds will go into forming the core 31. This range provides a desirable gel strength for the sheet-like absorbent structure of the present invention. With this amount of substance, it is expected that as much as 200–800 grams of water could be captured in a given absorbed structure. Given that an absorption of this amount of water will cause an of core 31, it is desirable that adequate space for expansion be allowed around the absorbent structure 21 once placed inside the electronic equipment. Typically, the initial dry state of the absorbent structure 21 should have a thickness 35 of between about 0.1 and 7.0 millimeters, and preferably between about 0.5 and 5.0 millimeters. The preferable amount of hydrogel-forming compound will be between about 0.1 to 2 grams of material to form core 31.

The total amount of hydrogel-forming compound and/or immobilizing material (such as spun cotton fibers) is determined by the target goal desired to protect the particular electronic component from excess liquid spill. Typically, the amount of spill will be less than one cup for a computer keyboard. The amount of compound will be limited by design to allow for expansion of the core when a hydrogel is formed, and for non-interference with the keys of a keypad and other movable elements. Application of heat to return the hydrogel to a dry state is thus enhanced.

The hydrogel-forming substances have a tendency to aggregate, thus there is a need to immobilize the materials within the core 31. An immobilizing means is thus provided. The immobilizing means in core 31 may be an inert filler or immobilizing material such as spun cotton fibers which would serve to hold the hydrogel-forming substance in place. Preferably, the filler either will not absorb liquids, or water that is absorbed will be easily removed by gentile heating or evaporation at ambient temperatures. The hydrogel-forming substances can also be laminated or impregnated into the top sheet 25 and/or back sheet 29 as an immobilization means. An adhesive such as acrylate or other suitable adhesive may be used to laminate the materials such as polyacrylate to the top and back sheets. Immobilizing the material within the core 31 is performed so as to not have them aggregate or move significantly within the structure 21, either dry or as a hydrogel.

Top sheet 25 can be either a water-permeable or water semi-permeable sheet of material, typically woven or non-woven polyethylene fiber, cotton or paper materials, or other fibers. The back sheet 29 can be either a water-permeable material such as cotton, paper, or woven polyethylene material, or a water-impermeable material. In some cases it may be desirable to have an absorbent structure with two water-permeable layers to encapsulate the hydrogel-forming core.

Also, there may be one or a plurality of walls of permeable or water-impermeable material within the structure such as shown in FIG. 6, with reference to wall 37. The wall 37 is coupled to the inside surface of the top sheet and inside surface of the bottom sheet. The wall 37 further compartmentalizes the hydrogel-forming core into smaller core structures, or cells A and 13, that serve to isolate the hydrogel-forming compound into smaller pockets or regions. This further compartmentalization may be desirable in some applications, especially when a greater degree of structural integrity is desired. Although FIG. 6 only shows one wall 37 and two cells A and B, it is understood that any number of walls and cells can be incorporated into absorbent structure 21.

Figure 5:
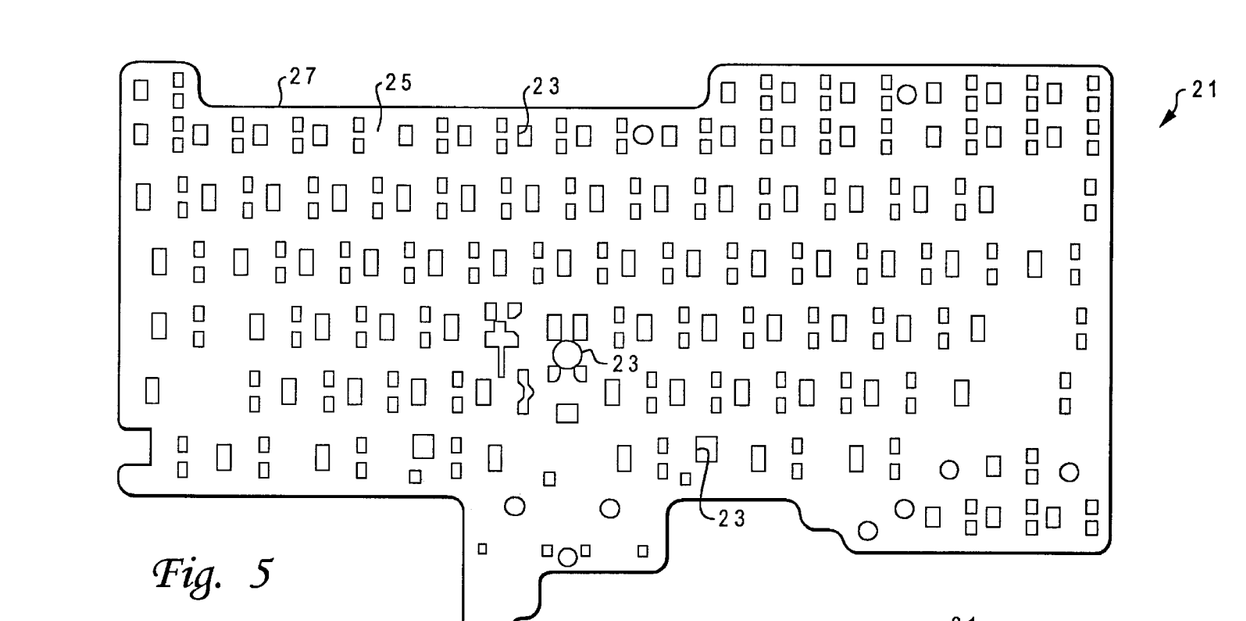
FIG. 5 is a top view of one embodiment of the absorbent structure of the invention to protect the circuit assembly of FIG. 3.

In the preferred embodiment of the sheet-like absorbent structure, the back sheet 29 is typically a water-impermeable sheet such as non-porous polyethylene, PVC or poly-vinyl sheet material or polyolefin. It is also ideal that back sheet 29 have some rigidity, as to impart some structural integrity to the absorbent structure 21. Further, having some rigidity to back sheet 29 will allow stiffness so that the formations and holes 23 may be stamped into the absorbent structure 21. It is expected that complex designs can be formed within the absorbent structure 21 to accommodate keypads, keyboards, and other devices that communicate with the underlying circuitry to be protected or devices that are exposed to moisture and thus in danger of having the underlying circuitry compromised. Various means may be used such as stamping to manufacture the formations 23; and the invention is not limited to any specific type of method.

Because of the affinity of the hydrogel-forming core for absorbing liquids, there will not be enough time for the spill or other liquid penetrations to pass through the absorbent structure 21 and short the underlying electronics. This offers an improvement over the prior art, in that liquids are rapidly stopped from entering the delicate circuitry of various electronic devices.

Another advantage of the present invention is the potential reversible nature of the absorbent structure. Preferably, a hydrogel-forming compound or mixture of compounds is used that can be easily dehydrated without removing the absorbing structure from the electronic device. However, a means is also be easily provided to remove the structure from the device to be gently heated or exposed to dry air, thus effectuating the dehydration and reuse of the structure. Further, the absorbent structure can also be easily replaced since it is either unattached within the device, or only reversibly attached by common means such as metal or plastic clips, compression springs, adhesive, elastomeric structures, and the like.

Another advantage to the present invention is the ease of cleanup that is afforded the use of the absorbent structure. Any spilled liquids that fall into the electronic device are collected in the structure, and if necessary, the structure can be completely removed and replaced, thus eliminating the need to clean a tray.

The present invention is simple, low cost, and does not interfere with the use of the electronic device. For instance, keyboards and keypads can be exposed using the absorbent structure of the present invention, while other prior art means of avoiding liquid penetration cover the keyboard and thus hinder its use.

While the invention has been particularly shown and described with reference to a preferred embodiment, it will be understood by those skilled in the art that various changes in form and detail may be made therein without departing from the spirit and scope of the invention.

What is claimed is:

1. A method of reversibly absorbing liquid penetrations into electronic devices having a body and circuitry, the method comprising:
   providing an absorbent structure in sheet-like form; the structure containing a hydrogel-forming core;
   placing the absorbent structure within the electronic device such that the hydrogel-forming core at least partly covers the electronic circuitry to be protected.

2. A method of reversibly absorbing liquid penetrations into electronic devices having a body and circuitry, the method comprising:
   providing an absorbent structure in sheet-like form, the absorbent structure having a defined thickness, the structure comprising a water-permeable top sheet, a hydrogel-forming core, and a back sheet;
   placing the absorbent structure within the electronic device such that the top sheet portion of the structure faces away from electronic circuitry to be protected.

3. The method of claim 2, wherein the absorbent structure is characterized by having formations that allow for access to and penetration of electronic and mechanical elements.

4. The method of claim 2, wherein the back sheet comprises a water-permeable material.

5. The method of claim 2, wherein the back sheet is substantially rigid.

6. The method of claim 2, wherein the defined thickness is between about 0.1 mm and 7 mm.

7. The method of claim 2, wherein the defined thickness is between about 0.5 mm and 5 mm.

8. The method of claim 2, wherein the hydrogel-forming core comprises one hydrogel-forming compound.

9. The method of claim 5, wherein the hydrogel-forming compound is sodium polyacrylate.

10. The method of claim 5, wherein the hydrogel-forming compound is a salt of acrylic acid polymers.

11. The method of claim 5, wherein the hydrogel-forming compound is unsaturated olefinic sulfonic acid polymer salts.

12. The method of claim 2, wherein the electronic device body is provided with a means for removing and replacing the absorbent structure.

13. The method of claim 2, wherein the top sheet comprises water-permeable polyethylene material.

14. The method of claim 2, wherein the top sheet is comprises a water-permeable cotton material.

15. The method of claim 2, wherein the back sheet comprises a water-impermeable polyethylene material.

16. The method of claim 2, wherein the back sheet comprises a water-impermeable olefinic material.

17. The method of claim 2, wherein the hydrogel forming core further has an immobilizing means.

18. The method of claim 2, wherein the absorbent structure is further divided into cells by wall structures.

19. An absorbent structure for protecting electronic devices from liquid spills, the absorbent structure comprising:
   a water-permeable top sheet, a hydrogel-forming core, and a back sheet, the combination of elements forming the absorbent structure having a defined thickness; and
   the absorbent structure has present therein formations that allow for access to and penetration of electronic and mechanical elements.

20. The absorbent structure of claim 19, in which the back sheet comprises a water-permeable material.

21. The absorbent structure of claim 19, in which the back sheet is substantially rigid.

22. The absorbent structure of claim 19, in which the defined thickness is between about 0.1 mm and 7 mm.

23. The absorbent structure of claim 19, in which the defined thickness is between about 0.5 mm and 5 mm.

24. The absorbent structure of claim 19, in which the hydrogel-forming core comprises one hydrogel-forming compound.

25. The absorbent structure of claim 19, in which the hydrogel-forming compound is sodium polyacrylate.

26. The absorbent structure of claim 19, in which the hydrogel-forming compound is a salt of acrylic acid polymers.

27. The absorbent structure of claim 19, in which the hydrogel-forming compound is unsaturated olefinic sulfonic acid polymer salts.

28. The absorbent structure of claim 19, in which the electronic device body is provided with a means for removing and replacing the absorbent structure.

29. The absorbent structure of claim 19, in which the top sheet comprises a water-permeable polyethylene material.

30. The absorbent structure of claim 19, in which the top sheet comprises a water-permeable cotton material.

31. The absorbent structure of claim 19, in which the back sheet is made from water-impermeable polyethylene material.

32. The absorbent structure of claim 19, in which the back sheet comprises a water-impermeable olefinic material.

33. The absorbent structure of claim 19, in which the hydrogel forming core further has an immobilizing means.

34. The absorbent structure of claim 19, in which the absorbent structure is further divided into cells by wall structures.

* * * * *